May 9, 1933. J. JORGENSEN 1,908,155
GRINDING FIXTURE FOR THREAD CUTTING TOOL BITS
Filed Feb. 12, 1931
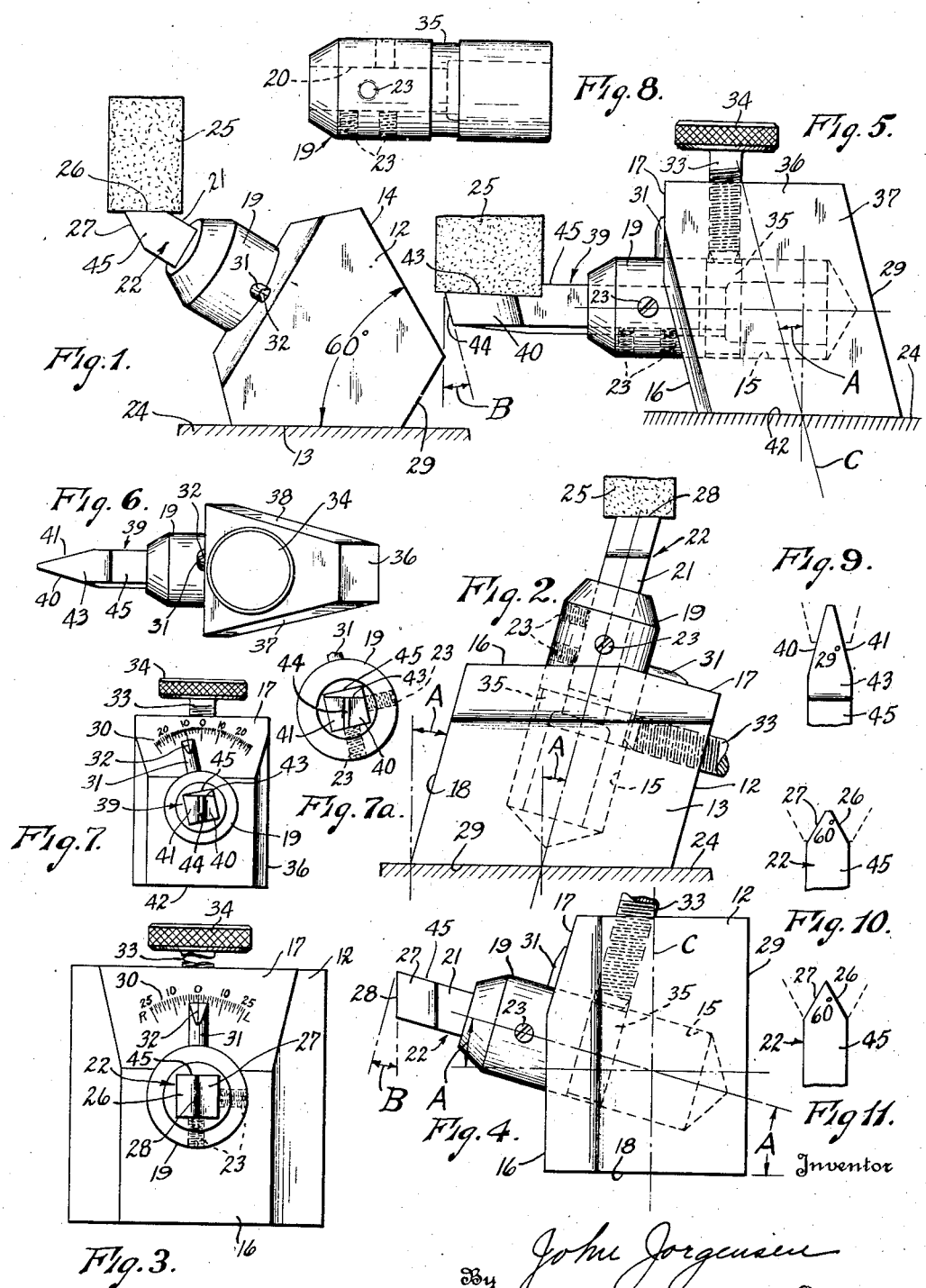

Patented May 9, 1933

1,908,155

UNITED STATES PATENT OFFICE

JOHN JORGENSEN, OF BRIDGEPORT, CONNECTICUT

GRINDING FIXTURE FOR THREAD CUTTING TOOL BITS

Application filed February 12, 1931. Serial No. 515,204.

This invention relates to new and useful improvements in grinding fixtures for thread cutting tool bits and has for an object the providing of a fixture whereby a thread cutting tool bit may be quickly and accurately ground to the proper angles.

A further object of the invention is to provide a fixture for the purpose stated and which includes means whereby the position of the tool bit relative to the grinder may be readily and accurately adjusted or set in order that the tool bit will be properly ground for the cutting of a particular thread as for example an Acme thread or a standard V or U. S. thread having a relatively large helix angle.

Additional objects and advantages will become apparent from a consideration of the following detailed description taken in connection with the accompanying drawing. It will be understood that the invention is not limited to the details shown and described but includes all such changes and variations as fall within the scope of the appended claims.

In the drawing:

Fig. 1 is an elevational view of the improved fixture in an operative position supporting a tool bit in engagement with a grinder.

Fig. 2 is a similar view showing the position of the fixture when grinding the end of a tool bit for the cutting of an "Acme" or "U. S." thread.

Fig. 3 is a face view of the fixture similar to that of Fig. 1, but with a square end.

Fig. 4 is a side elevational view thereof showing a tool in position in the fixture, and, Fig. 5 is an elevational view of a particular form of fixture for grinding a tool bit adapted for the cutting of Acme threads.

Fig. 6 is the top plan view of the device of Fig. 5.

Fig. 7 is a front or face view of the same.

Fig. 7—A is an enlarged face view of the tool and holder of Fig. 7.

Fig. 8 is an elevational view of the tool holder removed from the fixture, and,

Figs. 9, 10 and 11 show respectively an Acme, a U. S. and a standard V thread.

Referring in detail to the drawing and particularly to Figs. 1, 2, 3 and 4 the improved grinding fixture or tool holder includes the body 12 formed of metal and having its opposite sides 13 and 14 inclined and arranged in converging relationship as clearly shown in Fig. 1. The angle between these sides corresponds to the angle desired between the sides 26, 27 of the cutting tool 22. Thus for a standard V-thread this will be 60 degrees, and for an Acme thread it will be about 29 degrees. Body 12 is provided with a socket or recess 15 opening through its front wall 16. This front wall 16 includes an upper inclined portion 17 but the lower lower portion of the front wall occupies a vertical position when the body is resting on its lower or bottom surface 18 which surface is arranged at right angles to the lower portion of the front wall or surface.

As shown the socket or recess 15 is arranged at an incline and within the socket or more accurately extending through the front surface 16 of the body and having one end portion disposed in the socket is a tool holder 19. The tool holder, is of course, a rigid metal member and since the same fits relatively snugly in the socket 15 the holder will be positioned at the same angle as the angle of the socket. This angle A corresponds with the angle of rake desired on the free end of the cutting tool indicated at B and is usually about 15 degrees but may be anything desired. Thus the axis of the holder and tool is inclined to the longitudinal axis C of the body at an angle which is the complement of the angle A. The holder 19 has a square opening or recess 20 adapted to receive the square shank 21 of the tool bit 22 comprising a length of high grade tool steel. Of course, the tool bit 22 has its cutting portion disposed beyond the holder 19. Set screws 23 are provided through the walls of the holder for rigidly securing the tool bit in the holder.

In use the block or body 12 is set on either the side 13 or the side 14 on the movable bed 24 for example, of a surface grinder and held thereon by any suitable holding means such as a magnetic chuck. The holder is then passed under a grinding wheel a portion of which is shown at 25 to grind one of the surfaces of the tool bit. For example, the device is shown in Fig. 1 positioned to grind the surface of one side of the tool bit and this surface 26 will be ground parallel with the surface 13 of the body. When surface 26 is properly ground the body 12 is turned over to have it rest on its side 14 and then the other side or surface 27 of the tool bit will be ground in the same manner, the action being to grind the surface 27 parallel with the side or surface 14 of the body.

From what has been said it will be seen that by making the angle between the surfaces 13 and 14 the correct angle then the proper angle will be given to the surfaces or sides 26 and 27 of the tool bit. However, as the tool must have clearance or rake at its free edge 28 and also on the cutting edges it is necessary to incline the holder 19 in the manner previously described. If the rake angle, that is the angle at Fig. 4 is 15°, the socket 15 and the holder 19 are inclined 15° so that when the surfaces 26 and 27 are ground as above described the edge 28 of the tool bit will automatically be ground 15° to the vertical. This inclination of the holder 19 will also so incline the side surfaces 26 and 27 to give the required rake under the cutting edges.

When grinding a tool bit for the cutting of an Acme, U. S. square or like thread it is necessary to grind off the end of the tool to give the same a blunt end whereby the same will be the proper shape for the cutting of these threads. In order that this may be conveniently and accurately done it is merely necessary that the holder be arranged on the table 24 on the rear surface 29.

The fixture as thus far described may be successfully used for grinding of tools or bits for cutting threads having a relatively low or small helix angle, and although the helix angle of the thread cut with a tool so ground would not be strictly accurate, still for small helix angles it is sufficiently accurate in ordinary practice. However, for cutting a thread with a relatively large helix angle it must be accurately cut to be satisfactory and the surfaces 26 and 27 should be so inclined with respect to the horizontal center line of the bit as to compensate for variations or for the variation in the angle of the helix of the thread. As will be understood this angle will vary depending on the pitch of the thread and the diameter of the piece being threaded. The greater the pitch or the lesser number of threads per inch for a piece of a given diameter the greater will be the helix angle of the thread and the greater will, therefore, be the angle or offset of the sides 26 and 27 relative to the center line of the bit, I have provided means to compensate or whereby an operator may readily set his fixture to grind a bit to take care of any change in this connection.

To this end the upper or inclined portion 17 of the front or face surface or wall of the block or body 12 is provided with suitable graduations as indicated at 30. These graduations read right and left from zero in the center. The holder 19 is rotatable in the socket 15 and this holder carries a pin 31 having a hair line groove 32 for reading in connection with the graduations 30. To adjust the holder it is first necessary to release the same from a screw 33 having a knurled head 34. This screw 33 is threaded through the body 12 from the upper surface thereof and at its inner end engages in a groove 35 in the holder whereby the screw may prevent withdrawal of the holder from the body and may when tightened secure the holder in the desired position in the body.

In operation the operator knowing the size of the element to be threaded and the pitch of the thread he can calculate the helix angle and thus determine the angle to which the V-shaped end of the tool bit formed by the sides 26 and 27 must be off-set laterally in order to give the proper clearance in cutting the thread. The operator then turns the holder 19 to the right or left depending on whether a right hand or left hand thread is to be cut, the proper distance or number of degrees as indicated on the scale or graduations 30 when read in connection with the line 32 of the pin 31 and then clamps the holder in this adjusted position by tightening the screw 33. The holder is then adjusted to give the proper angle to the sides or surfaces 26 and 27 when the holder or fixture is used to present such surfaces to the grinder 25 as above described. It will be evident however, this adjustment of the cutting tool has thrown the top surface 45 of the tool out of the horizontal position or so that it is no longer at the correct angle to the side surface 26 and 27, and the thread would not be cut accurately, but if the end wall 18 (Fig. 2) or 42 (Fig. 5) of the block 12 or 36 is cut at the same angle to the rear wall 29 as the inclination of holder 19, or that if end wall 18 or 42 is parallel to the holder 19 and tool 22 then by placing the holder on this surface of table 24 and passing under grinder 25 as indicated Fig. 5 then this error is corrected, the top surface 43 is at the correct angle and the tool will cut an accurate thread.

A slightly different holder is provided for grinding a tool for the cutting of Acme thread. Such a different holder is necessary since an Acme thread has an angle of 29° while the U. S. and standard V-threads have an angle of 60°. The fixture or holder to be used for grinding a bit for the cutting of Acme threads is shown in Figs. 5, 6 and 7. This fixture includes a block or body 36 similar to the block or body 12 of the fixture previously described. Body 36 has inclined converging sides or surfaces 37 and 38 corresponding with and for the same purpose as the sides or surfaces 13 and 14 of the body 12. The only difference is a difference in the angle of inclination or convergence necessary in order that the tool 39 may have its side surfaces 40 and 41 ground to the proper angle for the cutting of an Acme thread.

The body 36 is provided with a tool holder 19 as in the case of the body 12 and in the body 36 has its lower or bottom surface 42 cut at an incline whereby the angle between this surface and the front surface 16 of the body is an acute angle. It is particularly desirable that the holder 19 be rotatably adjustable to vary the angle at which a tool will be presented to the grinder when such holder is in a block or body 36 particularly designed to grind a bit for the cutting of Acme threads. In the present instance the arrangement for this rotatable adjustment is the same in Figs. 5, 6 and 7 as in the other figures and includes the same scales or graduations and pin 31 having the hair line 32 adapted to be read in connection with the scale of graduations.

When grinding the tool 39 for the Acme thread the sides or surfaces 40 and 41 are of course, ground after the holder 19 has been properly adjusted relative to the scale or graduations 30 for the required helix angle. While the device is thus properly adjusted the fixture is placed in the surface grinder with the fixture resting on its inclined bottom 42 whereby the top surface 45 of the tool will be presented for grinding as shown in Fig. 5 to grind the horizontal surface 43 at the correct angle to the side surfaces 40 and 41. With the tool ground off-center as regards its surfaces 40 and 41 and with its top surface ground as at 43 it will be accurately shaped for the cutting of an Acme thread, all necessary clearance being provided for. Of course, when grinding the surfaces 40 and 41 the angle of the front surface 44 of the tool will automatically be taken care of as above described in connection with the grinding of the tool 22. By setting the block of Fig. 2 on inclined end 18 the top of the V or U. S. thread cutting tool can be ground in the same way to compensate for angular shifting of the tool and holder 19 for large helix angles, and of course also for small helix angles if absolute accuracy is desired for small as well as large helix angles.

From the foregoing description it will be seen that I have provided a fixture whereby a tool bit may be accurately ground to shape it for the cutting of perfect threads. At the present time it is shop practice to use the same tool where the helix angle is below about 15° but of course if it is accurate for one angle it is inaccurate for the others, and if the helix angle of the thread to be cut is 15° or more an operator grinds the tool by guess, the skill of the operator determining the degree of accuracy with which the tool is ground. With the improved fixture of this invention such guess work will not be necessary and the tool may be easily, quickly and accurately ground for all threads and helix angles, and since it will not be inconvenient the operator will have his tools accurately shaped whereby to always cut a perfect thread whether the angle of the helix be more or less than 15°.

Having thus set forth the nature of my invention, what I claim is:

1. In a grinding fixture, a body having converging surfaces adapted to alternately support the fixture in position to present a tool bit for grinding whereby opposite sides of the bit will be ground, and a tool holder between said surfaces and operable to turn the tool about its longitudinal axis relative to the body.

2. In a grinding fixture, a body having converging surfaces adapted to support the fixture in positions to present a tool bit for grinding whereby opposite sides of the bit will be accurately ground, and said body having a third inclined surface on which the body may rest to present the tool bit for the grinding of a third surface thereof, said body having a recess, a tool holder mounted in said recess for rotary movement to adjust the position of a tool in the holder, and means to secure the tool holder in adjusted position.

3. In a tool holder, a body having converging side surfaces serving to support the body in position for presenting a tool to a grinder for grinding inclined surfaces thereon, said body having a front surface, and a tool holder carried by said body and extending through said front surface and rotatably adjustable relative to said body whereby to adjust a tool about its longitudinal axis relative to the body.

4. In a tool holder, a body having on its opposite sides converging surfaces serving to support the body in position to present a tool bit to a grinder for grinding inclined side surfaces thereon, said body having a front surface, said body having an inclined recess opening through said front surface, a tool holder mounted in said recess and adapted to hold a tool bit in a position projecting from the front of the body, said tool holder rotatably adjustable in the recess, means for securing the holder in adjusted position, and said body having its rear surface inclined and adapted to support the body to support the bit in position for the grinding of the end thereof.

5. In a tool holder, a body having converging side surfaces serving to support the body in position for presenting a tool to a grinder for grinding inclined surfaces thereon, said body having a front surface, a tool holder carried by said body and extending through said front surface and inclining relative thereto, and said tool holder adjustable on the body to change the angle at which a tool carried thereby will be presented to a grinder.

6. In a grinding fixture, a body having converging side surfaces serving to support the body in position for presenting a tool bit to a grinder for grinding inclined surfaces thereon, said body having a front surface, a tool holder carried by said body and extending through said front surface and inclining relative thereto, said tool holder rotatably adjustable on said body, and means to secure the tool holder in desired adjusted position relative to the body.

7. In a tool holder, a body having converging side surfaces serving to support the body in position for presenting a tool to a grinder for grinding inclined surfaces thereon, an elongated tool holder carried by said body, and said tool holder adjustable about its longitudinal axis relative to the body to change the angle at which a tool carried by the holder will be presented to a grinder.

8. In a tool holder, a body having converging side surfaces serving to support the body in position for presenting a tool to a grinder for grinding inclined surfaces thereon, a tool holder carried by said body, said tool holder rotatably adjustable on said body, and means for securing the tool holder in desired adjusted position relative to the body.

9. In a grinding fixture, a body having a plurality of supporting faces on which it may be selectively disposed to support a tool bit to present it to a grinder for grinding inclined surfaces thereon, tool holding means on the body and inclining forwardly with respect thereto, said tool holding means adjustable on the body to change the angle at which a tool carried by the holder will be presented to a grinder, and co-operating means between the body and holder including a scale on said body and readable to determine the angle to which the holder has been adjusted relative to the body.

10. In a grinding fixture, a body having converging side surfaces serving to support the body in position for presenting a tool bit to a grinder for grinding inclined surfaces thereon, said body having a front surface and an inclined bottom surface, a tool holder extending through said front surface, said body adapted to rest on said bottom surface to present the tool bit to a grinder for the grinding of its top surface, a scale on the front surface of said body, said tool holder rotatably adjustable in the body, means on the tool holder and readable in connection with said scale, and means to secure the holder in adjusted position.

11. In a grinding fixture for a thread cutting tool, a body having converging side surfaces serving to support the body in position for presenting a thread cutting tool to a grinder for grinding the opposite side surfaces thereon, a tool holder between said side surfaces and mounted to turn about an axis inclined to the longitudinal axis of the body, means for securing the holder in adjusted positions, and an end wall inclined to the axis of the body at the same angle as the holder and adapted to support the body in position to present the top surface of the tool to the grinder.

12. A grinding fixture for a thread cutting tool comprising a body having converging side surfaces adapted to support the body in position for presenting a thread cutting tool to a grinder for grinding the side faces on said tool parallel to the said surfaces of the body, a tool holder projecting from the body through the wall between the greater spaced sides of the side surfaces and mounted to turn about an axis inclined to the longitudinal axis of the body, means for securing the holder in adjusted positions, said holder having a longitudinal opening to receive and hold the thread cutting tool, and said body having an end wall parallel to the axis of the holder adapted to support the body in position to present the top surface of the tool to said grinder.

In testimony whereof I affix my signature.
JOHN JORGENSEN.